(12) United States Patent
Reid et al.

(10) Patent No.: US 6,377,244 B1
(45) Date of Patent: Apr. 23, 2002

(54) ERGONOMIC COMPUTER MOUSE

(75) Inventors: James J. Reid; Dale E. Boudreau, both of Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/339,603

(22) Filed: Jun. 24, 1999

(51) Int. Cl.[7] ................................................. G09G 5/08
(52) U.S. Cl. ..................... 345/163; 248/118; 248/118.5
(58) Field of Search ................................. 345/163–166, 345/157–159, 167, 156; D14/402–410; 248/118, 118.1, 118.5; 463/36–38; 341/20, 22

(56) References Cited

U.S. PATENT DOCUMENTS

| | | | | |
|---|---|---|---|---|
| 4,862,165 A | * | 8/1989 | Gart .............................. 341/20 |
| 5,340,067 A | | 8/1994 | Martin et al. ............. 248/118.5 |
| 5,355,147 A | | 10/1994 | Lear ........................... 345/156 |
| D373,999 S | * | 9/1996 | Staats ........................ D14/409 |
| 5,570,112 A | | 10/1996 | Robinson ................... 345/163 |
| 5,576,733 A | | 11/1996 | Lo ............................. 345/163 |
| 5,648,798 A | | 7/1997 | Hamling ..................... 345/163 |
| D381,970 S | | 8/1997 | Gasca ........................ D14/114 |
| 5,726,683 A | | 3/1998 | Goldstein et al. ........... 345/168 |
| 5,865,404 A | | 2/1999 | Hesley ....................... 248/118 |
| 5,865,405 A | | 2/1999 | Hesley ....................... 248/118 |
| 5,868,365 A | | 2/1999 | Hesley ....................... 248/118 |
| 5,880,715 A | * | 3/1999 | Garrett ....................... 345/163 |
| 5,949,406 A | * | 9/1999 | Kress ......................... 345/163 |
| 6,005,553 A | | 12/1999 | Goldstein et al. ........... 345/163 |
| D418,824 S | * | 1/2000 | Reid et al. ................. D14/409 |
| 6,034,627 A | * | 3/2000 | Wei ............................. 341/20 |
| 6,072,471 A | * | 6/2000 | Lo ............................. 345/163 |
| 6,075,516 A | | 6/2000 | Rice ........................... 345/156 |

* cited by examiner

*Primary Examiner*—Richard Hjerpe
*Assistant Examiner*—Frances Nguyen

(57) ABSTRACT

In a manually movable computer mouse with a mouse movement sensing system for providing mouse movement signals, and at least one user finger operable control switch, for providing control signals for a graphic user interface, the mouse has a boomerang shaped body ergonomically shaped to fit and support the user's hand in a naturally relaxed curled hand positon, with a main body portion and a narrower neck portion extending at an angle of about 45 degrees to 90 degrees to the main body narrow enough to be interposeable between the thumb and first finger, and with an integral mouse movement control fin or tab extending above the mouse body and being thinly shaped to fit in the relaxed space between the first and second fingers (and to also provide an alternate pen-like grip between the thumb and first finger) to orient the mouse to the user hand and move the mouse with user arm movements. An integral wrist support may be provided extending from the wrist end of the mouse. The movement sensing system is adjacent that same end.

20 Claims, 11 Drawing Sheets

ERGONOMIC COMPUTER MOUSE

Cross-referenced are the same inventor's U.S. utility and design patent applications Ser. Nos. 09/339,606 and 29/106,594 (now U.S. Design Pat. No. D 418,824 issued Jan. 11, 2000) filed on the same date as this application, with the same assignee, the same title.

The use of a "mouse" as a manually moveable and operated graphic user interface (GUI) to control computers has become so widespread as to be nearly universal. ["Trackballs", "track pads", "joy sticks", "soft buttons" "mouse-pens", "light pens" and other GUI positioning or pointing systems are also well known, especially for laptop PC's, but proportionally less common]. The use of a mouse normally requires, of course, frequent two axis movement of the mouse by the hand, wrist and/or arm, and finger operation of integral or associated switches. Many millions of people are now moving and operating computer mice for many hours a day. Thus, it has become increasingly important to provide ergonomically improved mice designed to reduce user stress, fatigue, and/or injury, especially carpal tunnel syndrome or other such repetitive motion induced ergonomic problems.

Numerous prior efforts in this regard are noted in the patent literature, including U.S. Pat. Nos. Des. 381,970; 5,648,798; 5,576,733; and 5,355,147. Also, a (differently configured) "Anir" mouse by AnimaX International ASA of Norway.

Noted as of particular interest for hand and wrist support devices for use in association with a computer mouse intended to reduce or eliminate carpal tunnel syndrome are U.S. Pat. No. 5,570,112 issued Oct. 29, 1996 to Calvin H. A. Robinson; U.S. Pat. No. 5,340,067 issued Aug. 23, 1994 to Teresa A. Martin et al; and U.S. Pat. No. 5,868,365 issued Feb. 9, 1999 to William P. Hesley and assigned to Ergo Devices Corporation and their related U.S. Pat. Nos. 5,865,404 and 5,865,405.

By way of background, although a mouse with a conventional rotatable ball mouse movement signal generator is illustrated, the present invention is not limited thereto. It will be appreciated by those in the art that various mouse movement sensing system alternatives are well known and available, such as mice with optical sensors for sensing mouse movements (changed mouse positions) relative to patterned mouse-pads.

Disclosed in the embodiment herein is an improved computer mouse providing several advantageous features and differing in several respects from the above-cited prior patents.

By way of further background, a reported cause of carpal-tunnel syndrome is improper use of a computer mouse pointer. With a conventional such mouse the users can develop bad habits that may predispose them to development or aggravation of carpal-tunnel syndrome. These bad habits can include using excessive wrist angles to position the mouse pointer instead of using the forearm and fingers, such as placing the wrist flat on the desk surface with the wrist bent back at an angle greater than fifteen degrees, and pronation (inward rotation) of the wrist past a normal angle with fingers spread to reach around the mouse body and then gripping the mouse tightly. With the hand in any of these positions, finger motion (clicking) is believed to potentially irritate the tissues and nerves in the carpal-tunnel. Indiscriminate use of wrist or arm braces can exacerbate the effects.

In contrast, the disclosed embodiment of a new mouse design in the example below induces a more natural and better hand and wrist position, provides easy and natural operation, provides optional wrist support, discourages severe wrist deviation, and encourages good hand and finger movement habits. Alternatively, this disclosed computer mouse embodiment can provide the user with the ability to hold and control the mouse in more than one way, so that alternate hand positions can be used to relieve discomfort, if desired.

This is accomplished in the disclosed embodiment by a simple, low cost, mouse which is comfortable, intuitive and can reduce repetitive stress problems such as those described above and in the above-cited patents. It does not require such a radical departure from the grip and operation of a normal mouse as to be un-intuitive and/or require retraining to regain positional control dexterity.

A more specific feature of the specific embodiments disclosed herein is to provide a user hand movable computer mouse with a mouse movement sensing system for providing mouse movement signals, and at least one user finger operable control switch, for providing control signals for a graphic user interface, the improvement in said computer mouse comprising; a mouse body ergonomically shaped to fit and support the user hand in a naturally relaxed hand position, and a mouse movement control fin integral said mouse body for said user hand mouse movement, said control fin extending substantially above said mouse body, said control fin being thinly shaped to fit in between adjacent fingers of the users hand to orient said mouse body to the users hand and for said user hand movement of said mouse.

Further specific features disclosed herein, individually or in combination, include those wherein the user hand movable computer mouse body has a main body portion and an extending neck portion, and said extending neck portion extends at an angle to said main body portion; and/or wherein said control fin is adapted to be alternatively grasped between the users thumb and first finger for pen like movement of said mouse thereby; and/or wherein said control fin is integral said main body portion and is elongated along an axis generally parallel to the axis of said main body portion; and/or wherein said mouse movement sensing system is positioned in said main body portion adjacent one end thereof opposite from said extending neck portion; and/or wherein said extending neck portion has control switches on opposite sides thereof; and/or wherein said main body portion has an attached extending wrist support trailer member; and/or wherein said extending neck portion is at an angle of between approximately 45 degrees to 90 degrees to said main body portion; and/or wherein said mouse is a dual use mode mouse shaped to provide two different ergonomically correct hand supporting and mouse hand movement positions, wherein; said control fin is adapted to be loosely held between the adjacent first and second fingers of the users hand in a first hand position, and said same control fin is adapted to be held in a second and different hand position in which said control fin is gripped between the thumb and first finger of the users hand in a pencil-like hand grip; and/or wherein said mouse has at least two duplicative function but differently positioned said user finger operable control switches for said respective dual use modes.

As to specific components of the subject apparatus, or alternatives therefore, it will be appreciated that, as is normally the case, some such components are known per se in other apparatus or applications which may be additionally or alternatively used herein, including those from art cited herein. All references cited in this specification, and their references, are incorporated by reference herein where appropriate for appropriate teachings of additional or alternative details, features, and/or technical background. What is well known to those skilled in the art need not be described here.

Various of the above-mentioned and further features and advantages will be apparent from the specific apparatus and its operation described in the specific examples below. Thus, the present invention will be better understood from this description of these specific exemplary embodiments, including the drawing figures (approximately to scale) wherein.

Figure 9:
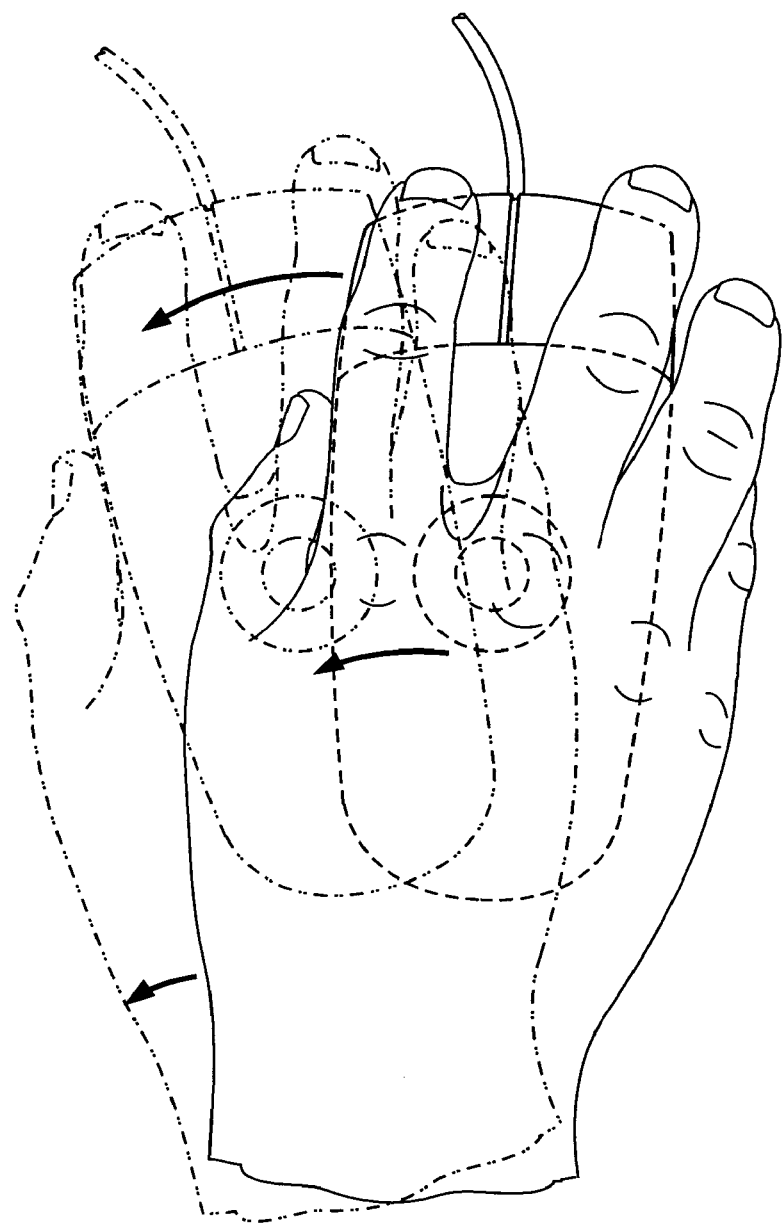
Figure 10:
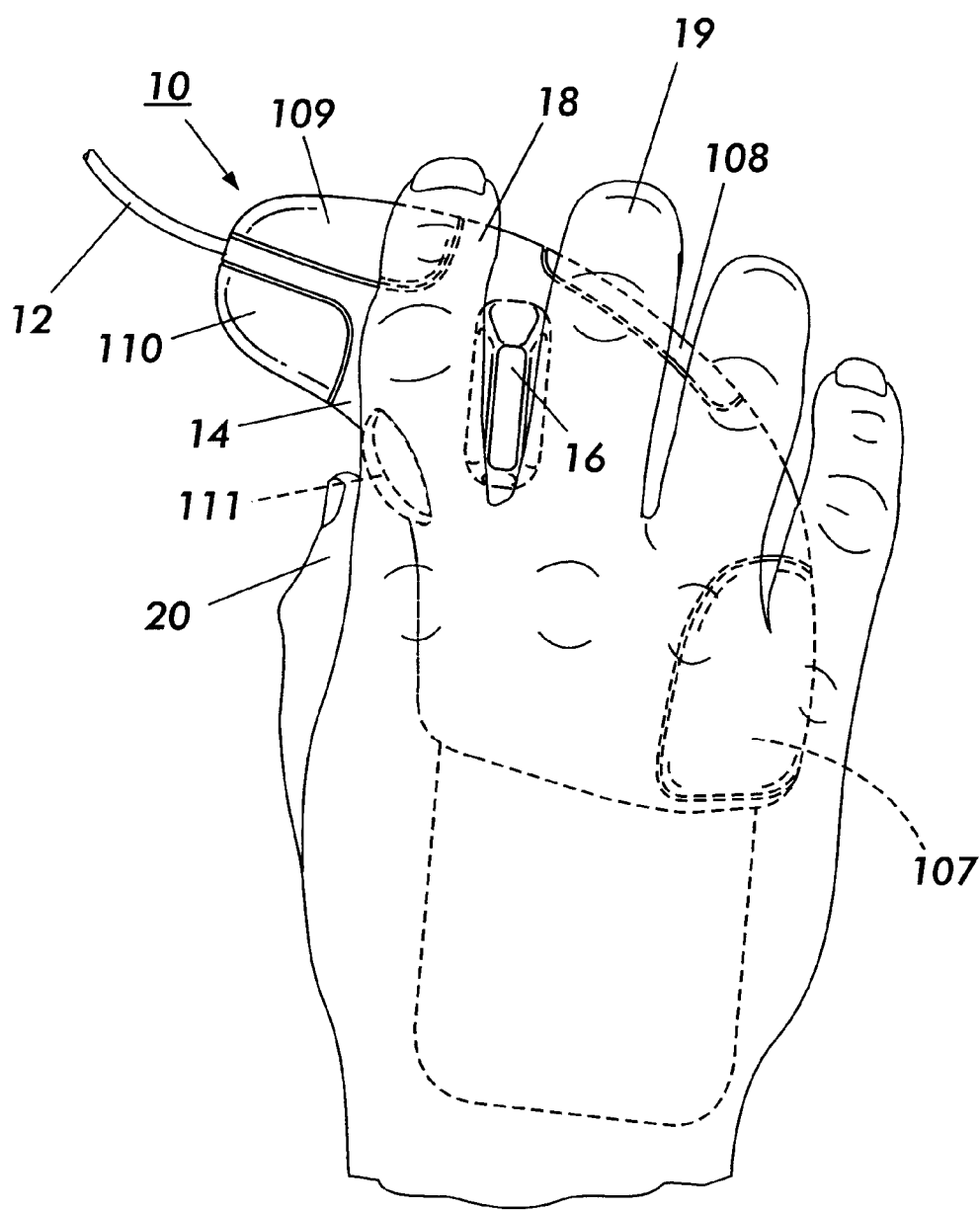
Figure 11:
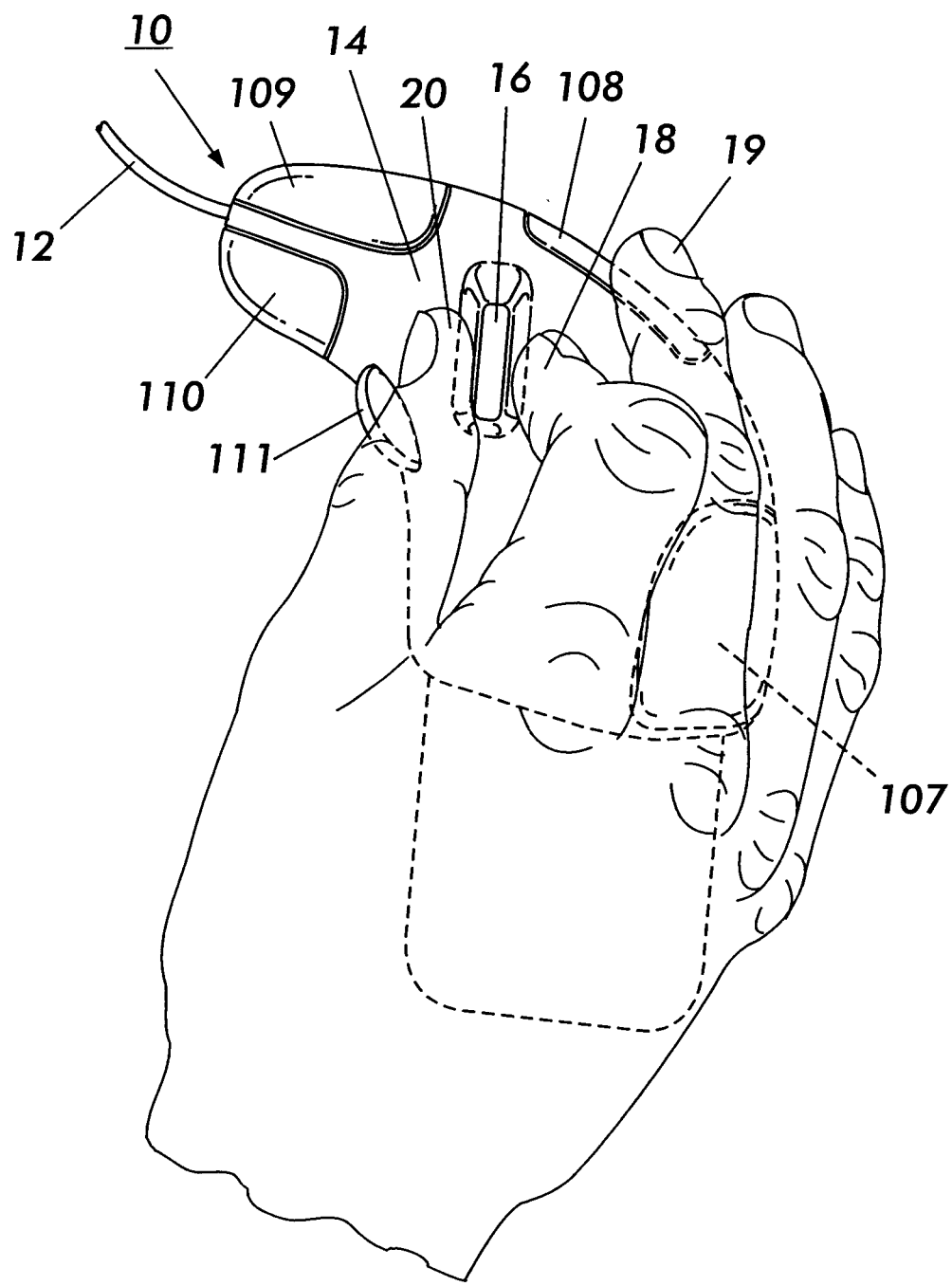

FIG. 9, labeled "prior art", is a schematic top view of the operation of a conventional mouse, with an exemplary tracking ball position and exemplary operator hand and wrist movements relative thereto illustrated in phantom lines;

FIG. 10 is a similar view to that of FIG. 9 illustrating the difference in the operator hand and wrist positions for the exemplary ergonomic mouse of FIGS. 1–8; and FIG. 11 illustrates an alternative, "pencil grip", hand or grip position compared to that of FIG. 10 for the exemplary ergonomic mouse of FIGS. 1–8 and 10.

Described now in further detail, with reference to the Figs., is one exemplary embodiment of the subject improved ergonomic computer mouse. There is shown in FIGS. 1–8 and 10–11 one example of a computer mouse 10 incorporating several ergonomic and other advantages and features. The subject mouse may have some or various combinations of these disclosed features, i.e., they are not all essential to the claimed invention. It will also be appreciated that a right-handed operator or user mouse 10 is shown, and that a left-handed user version of this mouse could have an opposite or mirror image basic configuration.

The improvements to be further described herein relate to this exemplary mouse 10 per se. As noted above, the GUI functions of a mouse, the electronic components and their hardware and software interface between a manually operated computer mouse and various connecting PC's or other computers, and/or various graphic user interface displays therefore, are well known and may vary and need not be re-described in detail here. Likewise as to the internal circuitry of the mouse, which may also be of various known or conventional types.

Figure 8:
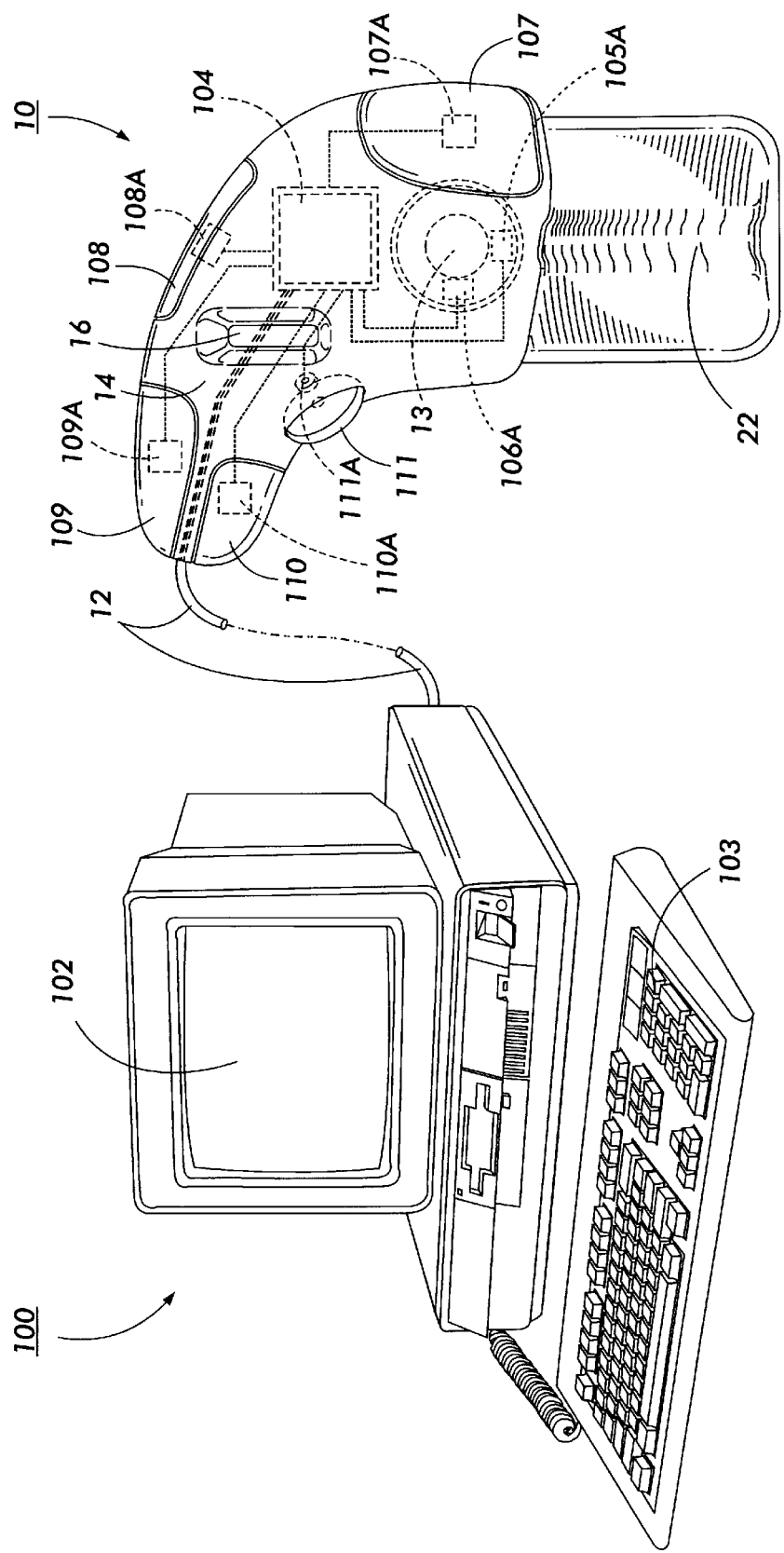
FIG. 8 is a top view thereof in operative connection with a conventional computer, and with exemplary internal electrical components shown in phantom.

However, especially for background and reference purposes, FIG. 8 here is provided showing one example of possible internal electrical components of the mouse 10 operatively connected to an exemplary conventional computer 100 having a GUI display 102 and keyboard 103. In FIG. 8 the mouse 10 is shown with conventional exemplary internal circuitry 104 in phantom lines, with outputs connecting by cable 12 to the computer 100, including conventional mouse ball 13 movement tracking sensors 105 and 106, and finger switches 107A, 108A, 109A, and 110A, respectively actuatable by illustrated variously positioned external buttons 107, 108, 109, and 110 by way of examples, but not limited thereto. Also exemplary illustrated in FIG. 8 as connected to circuitry 104 for cable output 12 is a scroll input signal generator 111A operable by a thumb-wheel scroll input 111. These or various other alternative suitable sensors and switches are well known per se and need not be described in further detail herein. The connecting cable 12 can, of course, be replaced by various IR or other wireless interfaces, as is well known.

Further by way of background, FIG. 9 here illustrates one example of the undesirable wrist movement or deviation and hand position of a conventional computer mouse.

Turning now to the subject ergonomic exterior configuration of the mouse 10, as shown in all the FIGS. 1–8 and 10–11, as will be further described, the mouse 10 is generally a generally horizontally extending smooth integral outer shape, which is somewhat "boomerang" or angularly shaped with an angled neck portion 14 extension at its outer or rear end (the end facing away from the operator in use). Intermediately extending from the mouse 10 adjacent the angled neck portion 14 is a thin and substantially vertically upstanding tab or fin 16. This fin 16 is shaped to comfortably extend in between the relaxed first 18 and second 19 fingers of the operator as shown in FIG. 10. (Or, alternately, be readily grasped between the operator's thumb 20 and first finger 18 in the alternate operating position of FIG. 11). Using the fin 16, the user can easily guide the mouse without griping it, as in FIG. 10. The fin 16 can also be grasped like a pencil, as in FIG. 11. The front end of the mouse 10 has an extending integral or attachable "trailer" wrist support 22.

The mouse 10 per se (not including the detachable wrist support 22), i.e., the integral unit of the main body of the mouse and its neck portion 14, has the general shape defined by the pocket formed by a relaxed human right hand. Thus, as gripped, the main body of the mouse 10 is aligned with the axis of the user forearm and the neck portion 14 of the mouse is off-axis or at an angle to the main body of the mouse and the user forearm by approximately 45 to 90 degrees. As will be further described, that novel arcuate configuration of the mouse 10 might tend to rotate which its control buttons are pressed if it were not for its other features, specifically the fin 16.

The illustrated mouse 10 embodiment has diagonal touch points, a side button operation, and a built-in wrist support, as identified above and in the drawings. These features provide ergonomic benefits, as will be further discussed. The button placements, unique shape, and anatomic support provided combine to provide such benefits. The diagonal touch points provide low impact operation.

As shown in FIG. 11, this mouse 10 also incorporates features that allow it to be alternatively hand-held more like a writing pen for a high degree of positional control with an alternative ergonomically correct pencil-like grip. Unlike a "mouse-pen", however, the mouse 10 can be left standing in the same, normal, stable position on any conventional mouse-pad. Many prior ergonomic mouse designs have concentrated on prevention by providing a modified hand grip position. However most of such prior designs do not adequately encourage or keep a user from using the mouse incorrectly. That is, do not adequately encourage correct or improved hand, finger and wrist positioning and movement. Although the mouse 10 can provide some of the benefits of a wrist brace, it does not artificially restrict the motion of the hand and wrist.

Figure 1:
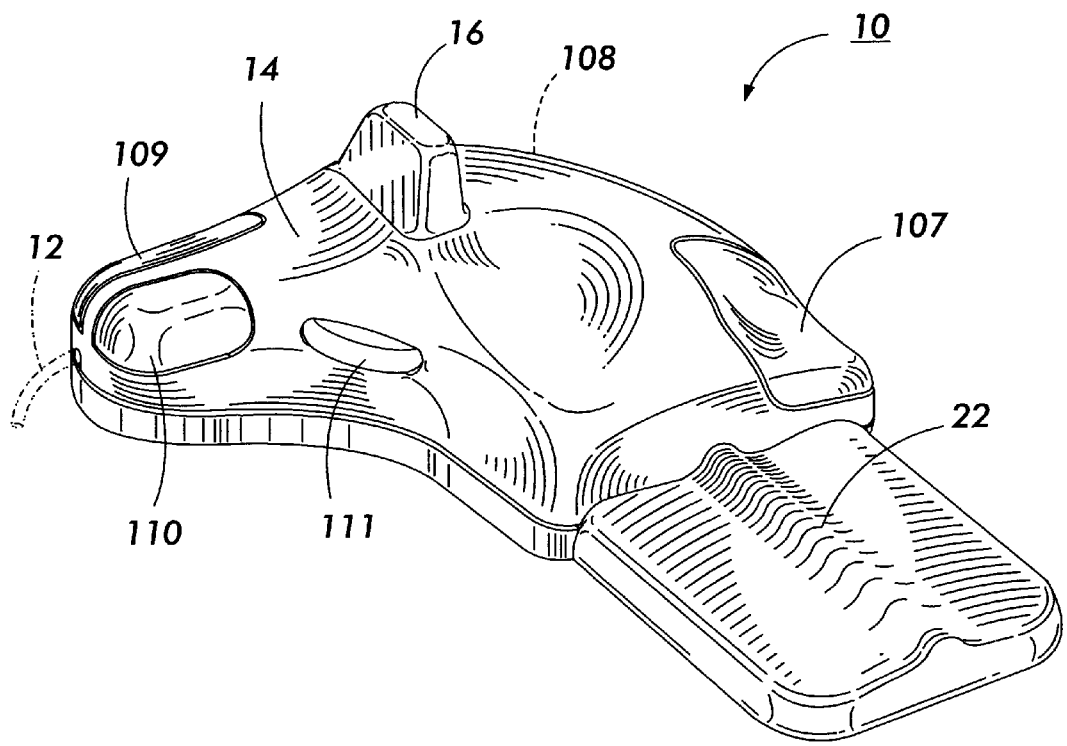
FIG. 1 is an overhead perspective view of one embodiment of the subject improved ergonomic computer mouse.
Figure 2:
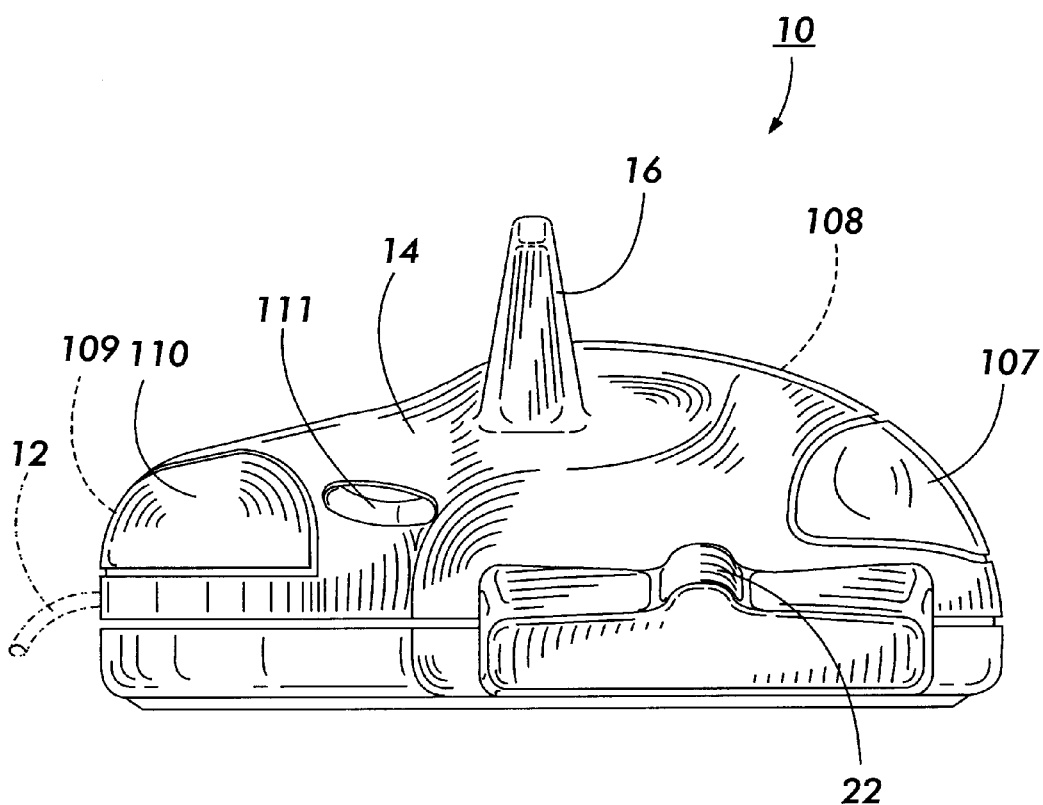
FIG. 2 is a front (to the user) view thereof.
Figure 3:
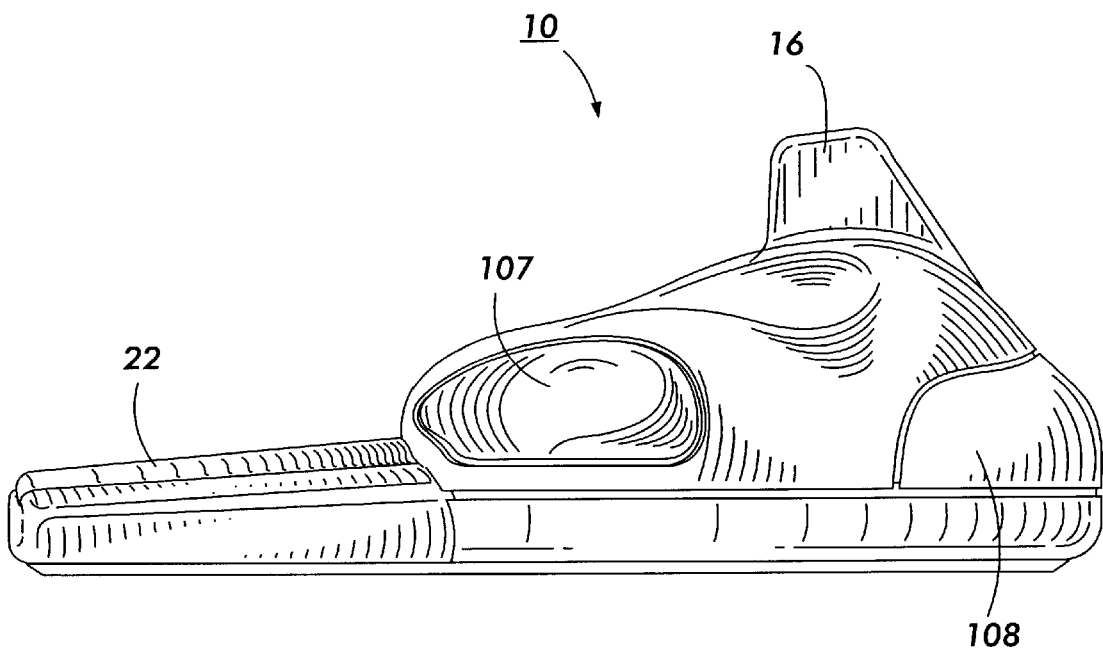
FIG. 3 is a right side view thereof.
Figure 4:
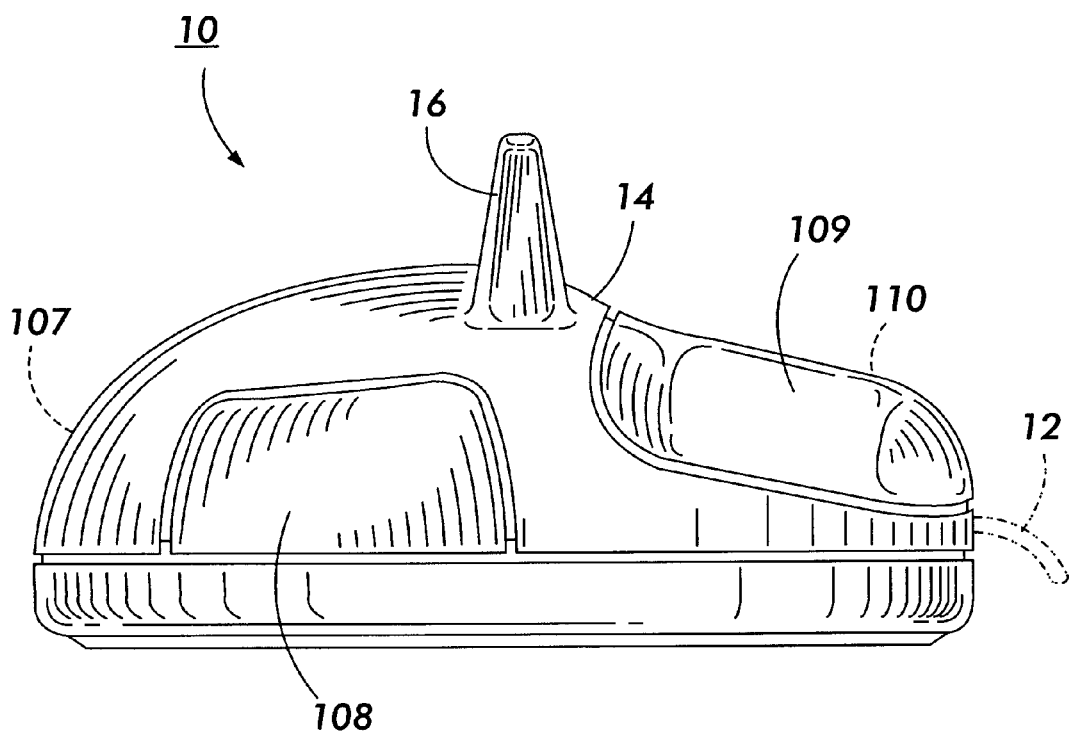
FIG. 4 is a rear view thereof.
Figure 5:
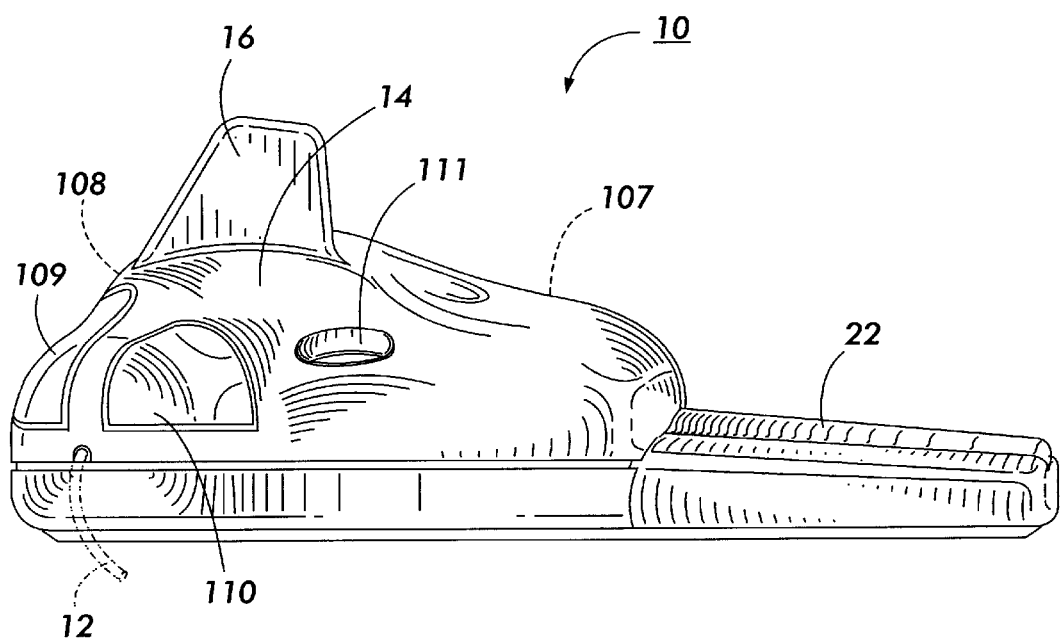
FIG. 5 is a left side view thereof.
Figure 6:
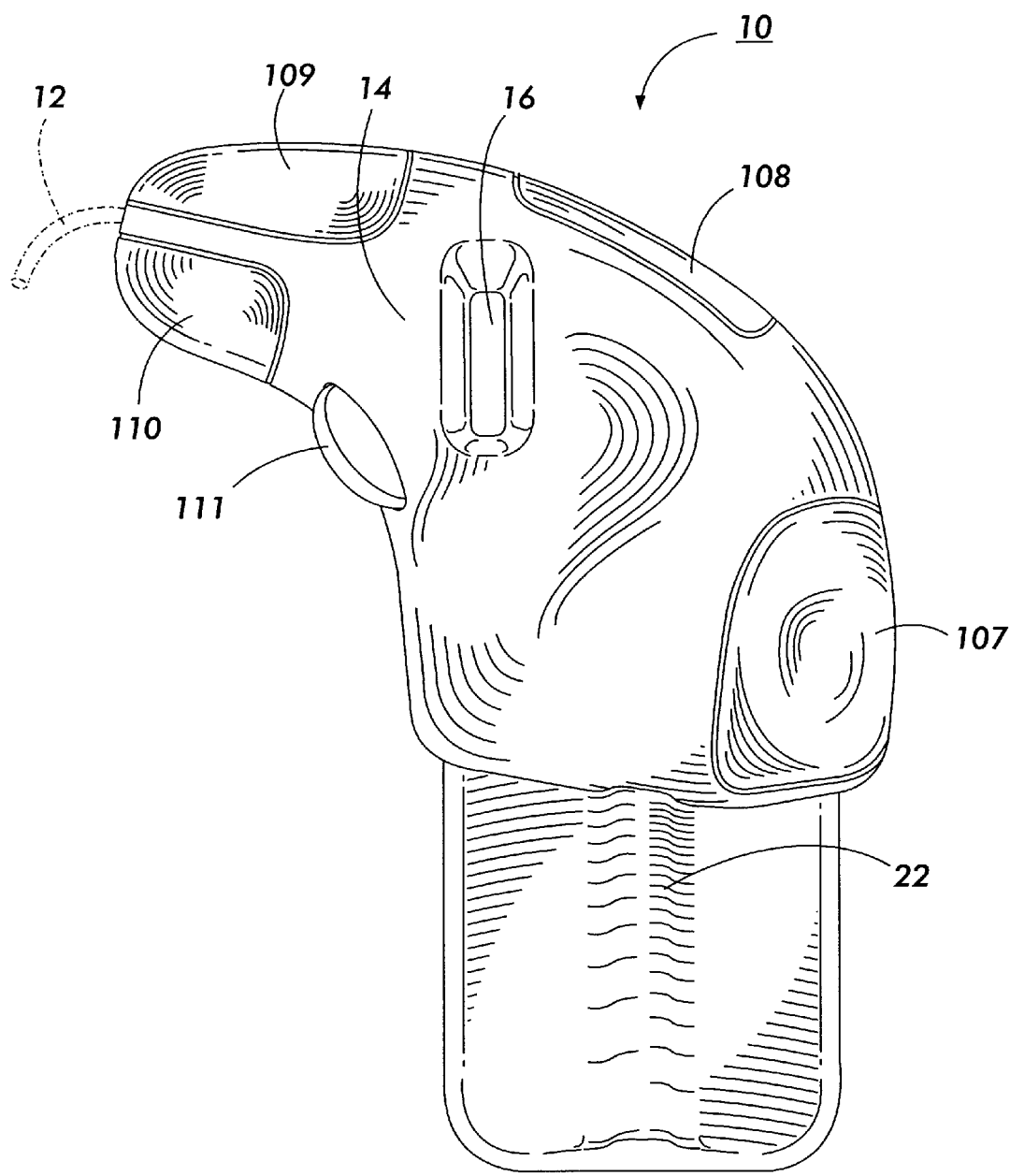
FIG. 6 is a top view thereof.
Figure 7:
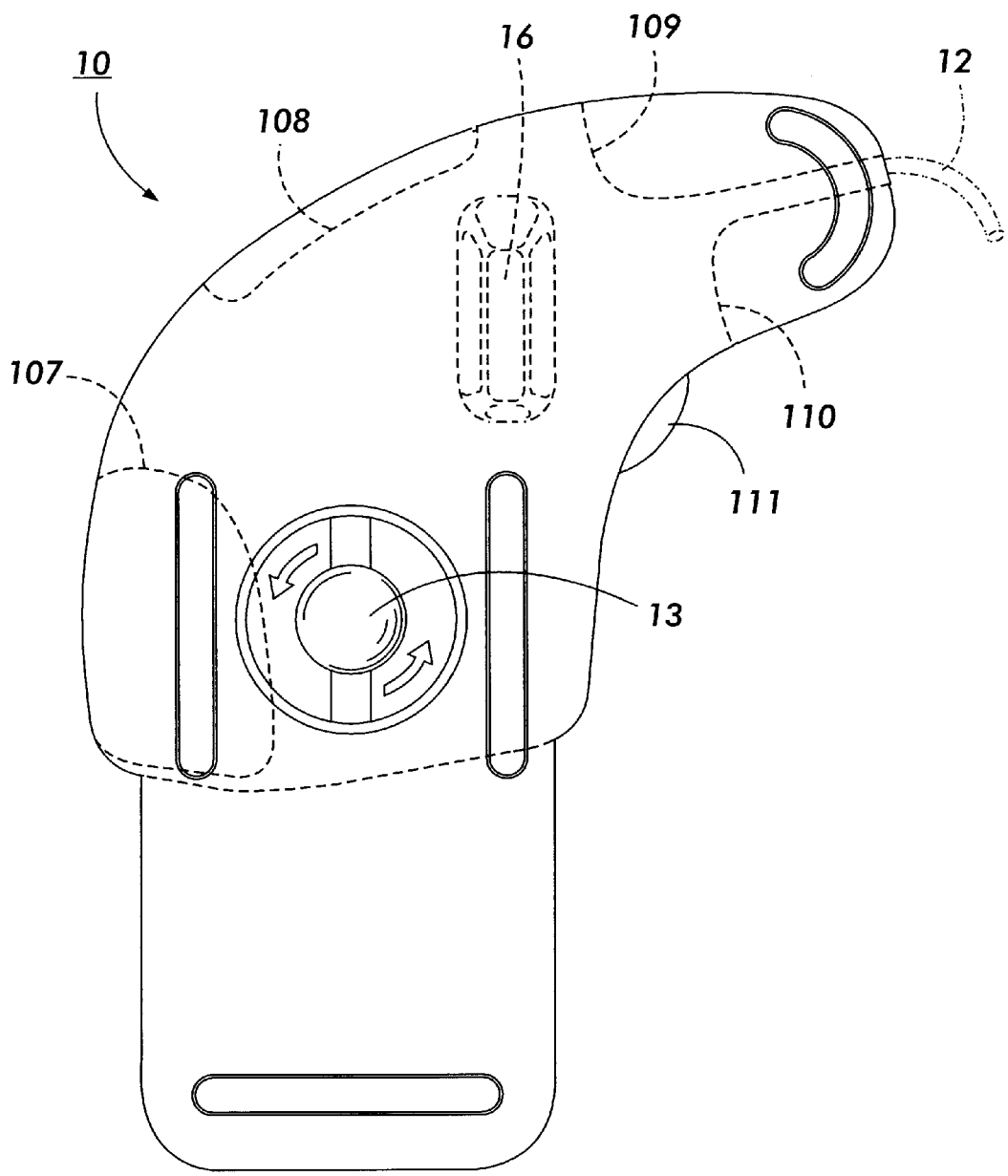
FIG. 7 is a bottom view thereof.

Turning to these disclosed features of the exemplary mouse 10, briefly, the trailer or wrist support 22 moves integrally with the mouse 10 to support the wrist and to reduce wrist-hand angle front to back, and to limit side-to-side wrist motion. The shape of the mouse 10 provides an improved grip shape that allows and induces the user's fingers to wrap around the mouse body in a relaxed, natural, hand position. The mouse ball 13 or other mouse movement sensor is positioned under where the palm of the hand is positioned by the mouse 10. That is, as shown in FIGS. 7 and 8, the mouse ball 13 is adjacent the user or front edge of the main body of the mouse, adjacent the trailer or wrist support 22, unlike conventional mice where the ball is typically more centrally located. That makes the mouse 10 ineffective to deviate the wrist, since such a wrist action would essentially pivot the mouse around the ball 13 rather than move the ball 13. That is, the undesired prior art user wrist movement illustrated in the prior art example of FIG. 9 is effectively discouraged by the configuration of the mouse 10.

The mouse 10 operating or click buttons illustrated include dual (either is operative) left click buttons 109 and 107 on the near right side and the far right side (out on the angled neck portion 14) ends of the mouse. The button 109 is on the outside of the angled neck portion 14. The button 107 is near the wrist support 22. In the mouse 10 hand grip or hand position mode of FIG. 10 the button 109 can be used for first (index) finger 18 operation—i.e., the well known "left-click" button action commonly provided on a mouse, and most often used. The user can click button 109 with the index finger or click by squeezing the mouse between the thumb and index finger. Alternatively, especially in the pencil-grip hand position mode of FIG. 11, the alternative little-finger button 107 can be used as the left click button.

For the "right click" function the squeeze button 108 is provided centrally of the far right hand side of the mouse 10, to the right of the button 109. I.e., more or less aligned with or along the central axis of the mouse, the wrist-rest 22, and the mouse ball 13, and in front of the fin 16. Squeezing this side-mounted outer-end mouse button 108 between the thumb and the second or middle finger 19 and/or the third or ring finger provides the "right-click" button action commonly provided on a "two-button"mouse.

To repeat, as to the disclosed control buttons, this particular exemplary mouse 10 has left-click buttons on both ends. One left-click mouse button 109 is positioned under the index finger. The same left-click button function is repeated in a button 107 that is located here under the base of the little finger, at the prominence created by the joint between the proximal phalanx of the little finger and the distal head of the metacarpal bone (the phalangeal-metacarpel joint). With these click buttons in both these positions the user can click with the index finger or click by squeezing the mouse between the thumb and little finger. The muscles that control the squeezing action do not pass through the carpal-tunnel. This motion is a simple closing of the hand, which will increase the carpal arch, opening the tunnel. The fin 16 assures that the users hand is in the correct position to use this feature.

The side-mounted button 108 that falls under the fingertips of the middle and ring fingers provides the right-click function. Squeezing the mouse between the thumb and these fingers provides the right-click action. The finger motion occurs at the second finger joint instead of the knuckle. The ligaments that control this action do not pass through the carpal-tunnel. The squeezing action will also increase the carpal arch, opening the tunnel.

For maximum benefit in use, the heel of the palm of the hand should desirably rest on the trailer wrist support 22 with the fingers wrapped loosely around the mouse body, as shown in FIG. 10. In that preferred mode or grip of FIG. 10, the fin 16 is positioned between (extends up between) the index or first or index finger 18 and the middle or second finger 19. With the palm of the hand in this FIG. 10 position on the mouse 10, some user wrist movement is possible, but limited, and weight is resting primarily on the wrist support 22. The user will thus move the mouse 10 with shoulder and forearm muscles for gross X-Y coordinate GUI pointer positioning. The fingertips, and only moderate wrist movement, can then provide fine positioning.

A key feature of this illustrated design for proper functioning is the presence, and outer-central location, of the vertically extending fin 16 on top of the main body of the mouse 10. With the mouse fin 16, the mouse 10 orientation is fixed relative to the user's hand. The user, without any conscious effort, will guide and position the mouse 10 using the fin 16 and his or her engaging distal and middle finger joints. The low-profile power-grip shape of the mouse 10 would also be less practical without the fin 16 because the mouse could turn in the users hand. Note that the fin 16 is relatively thin in width and is elongated in the forward direction generally along the central axis of the main body of the mouse 10. The fin 16 has a width approximating a normal natural spacing between the index and middle fingers, and is held within that space in the handgrip mode of FIG. 10. This prevents unintended rotation of the mouse. The fin 16 also automatically aligns and holds the user's hand (the fingers in particular) in the correct position and orientation relative to the respective mouse finger control buttons 108, 109, 110, and/or 111, since these finger control buttons are in fixed positions relative to the fin 16 position, with preset spacings from the fin 16 position proportional to normal finger sizes.

The side pressure (squeeze) button controls would also be less practical without the fin 16, because applying side pressure could cause the mouse to turn in the users hand. The wrist trailer 22 would also be less practical without the fin 16, because, with the wrist relatively immobilized, fin 16 guidance of the mouse 10 with middle and distal joint finger motion is used for mouse positioning. The under-palm ball 13 utilizes fin 16 hand guidance for fine positioning of the mouse 10 instead of wrist deviation.

To summarize, the fin 16 fits into the space between two fingers (the index and middle fingers, or, alternatively, between the middle and ring fingers). This feature provides easy repeatable hand positioning of the mouse 10, that is of high importance. When held in this position, the user can guide the mouse 10 by the fin 16 without the need to grip the mouse with the fingers. This floating action encourages the user to relax his/her hand when using the mouse.

All of these features contribute to the ergonomic benefits by supporting the hand and wrist in a selected, relaxed, neutral, position during active operation.

The fin 16 can even be hinge-mounted or otherwise be mounted to fold down or be removable. That will allow the mouse to be lowered in height or disassembled to pack more easily into a laptop carrying case, if desired.

In the alternative "pen" hand grip use or mode of the mouse 10 shown in FIG. 11, the fin 16 can be alternatively used as a pencil-grip control device, with separate functional enhancements and ergonomic benefits. As shown, the fin 16 there is gripped between the thumb and the (flexed) first finger, and the mouse 10 position is controlled thereby. The ability of a user to thereby alternate between two completely different operative hand positions and grips on the same mouse 10 can provide further ergonomic and other user benefits.

In this alternative grip mode, the mouse 10 can also be alternatively grasped like a pencil for tasks that require a high degree of pointer control. That is, very fine movements, such as for working with very small screen objects or for doing screen artwork. Muscle movement in general requires moderation by another muscle. Using one body part to act as a resisting force to another enhances positional control. Moving a lever with two hands gives better control than moving it with one. When writing with a pencil or pen the thumb and fingers resist each other to provide a high degree of control over the position of the pencil point and facilitate rapid direction changes. This enhanced control is the result of a combination of physical forces and the synergistic effect of propriocepive neurons of opposing body parts. It is also typically a highly developed motor skill in most adults from years of writing. The dual function mouse 10 can thus also provide unique advantages for users with specific conditions, and for children who have not developed the fine eye-hand coordination of an adult.

When the fin 16 is being grasped like a pencil, with the hand in that position, the little-finger will curl under and be positioned over the little-finger button 107. This feature provides high positional control, using the small muscles of the fingers whose ligaments do not pass through the carpal-tunnel. This hand position is also ergonomically correct. Left-click function is by rotating the hand outward (supinating) so that the little-finger presses on the little-finger button. This is a smooth natural motion that does not alter the pointer position as fingertip clicking often does. The right-click function can be accomplished by extending a finger to the button 108. This method has additional ergonomic benefit, especially where there is median nerve involvement.

Another advantage of the mouse 10 over a conventional mouse-pen, which is particularly enabled by the fin 16, is the consistent always "standing upright" position of the mouse for quick acquisition and gripping, with the user using his/her peripheral vision to locate the device. That is, the mouse 10 does not fall over when it is not being held, as many mouse-pens do.

The alternate little finger button 107 is also a contributor to this alternative mode of operation of FIG. 11. With this grip, other button actuation types or locations may tend to disturb the mouse pointer 10 position when clicked, such as a barrel button or down pressure button of a mouse-pen. An unexpected benefit of the little-finger button 107 is that, in either mode or grip, the down pressure of its operation tends to freeze the pointer position, stopping pointer drift, thereby reducing double-clicking errors.

Turning to further ergonomic advantages, the mouse 10 shape and size allows a user to wrap his/her hand around the mouse body in a relaxed "power-grip" position. The mouse 10 top contour turns the hand slightly, so that the hand is not in a highly pronated position. The long axis of the mouse 10, including its extension 14, is angled approximately 45 to 90 degrees from the axis of a conventional mouse. This allows the user's fingers to wrap around the mouse body in a relaxed, natural position. This grip is described by ergonomists as a "power grip" and is a preferred ergonomic grip. The thumb end of the mouse is narrow, to promote a high arch of the hand, thus increasing the carpal arch, opening the carpal-tunnel. The broader base of the mouse 10 main body provides support for the palm of the hand.

The mouse ball 13 central positioning under the palm of the hand position on the mouse 10 makes it ineffective to deviate the wrist since that action would essentially pivot around the ball 13, as previously noted. The presence of the trailer 22 can enhance this feature. The mouse ball central axis position also places the functional components along the center axis of the main body of the mouse 10. (To reduce actuation pressures, mouse buttons may be part of a lever that actuates a remote switch). In this way the functional internal parts of right and left handed versions of the mouse 10 may be the same, with different top covers, reducing manufacturing costs.

The size and contour of the mouse 10 also allows the users fingertips to rest lightly on the underlying mouse-pad on which the mouse moves. Touching the fingertips on the mouse pad desirably connects the position of the users hand and the mouse pad through the tactile nerve endings of the fingertips and the proprioceptive (position sensing) neural receptors in muscles and joints. Without this tactile connection the position, direction, and speed of mouse movements relative to the screen pointer position is only through continuous visual feedback from the mouse pointer or other cursor on the GUI display screen 102. The advantage of this tactile mouse movement connection is enhanced by the presence of the fin 16. Since the nerve-sensitive adjacent inside finger skin surfaces of the first and second fingers are desirably constantly touching the respective opposite sides of the fin 16, the mental reference to the mouse/hand connection becomes a point with a known orientation. This tactile reference to the mouse fin and the mouse-pad and a learned relationship between hand motion and visual pointer movement can reduce the level of conscious discrimination needed when positioning the mouse screen pointer to a screen 102 target, and possibly reduce fatigue in long term mouse usage.

The wrist trailer 22 here can be a simple pad attached to the base of the mouse 10 that supports the wrist. It has two basic functions. It supports the wrist to reduce the wrist-hand angle (dorsiflection). It also prevents severe angular, side to-side, deviation of the wrist. When the wrist is in place, the user has limited ability to deviate the wrist for fine positioning of the mouse pointer. Instead the user will position the mouse using the forearm for gross positioning and the fingers tips for fine motion. The narrow neck and fin of the mouse 10 allow the fingers to move in motions similar to those used when drawing with a pencil.

The trailer 22 may be detachable, since those users who already position the mouse using these motions may not want it in place. The trailer 22 may be constructed in layers so the user can customize the height and angle. One method of accomplishing this is to use hook-and-loop material (Velcro) with the trailer 22 consisting of a stacked plurality of soft "loop" covered foam pads backed with "hook" material.

Even without the fin 16, or with alternatives thereto, the mouse 10 provides several of the above-described and other ergonomic advantages. As noted, the entire mouse body ergonomically shaped to fit and support a user hand in the natural relaxed position of the human hand. That is, with the fingers naturally curled into a position spaced from and in opposition to the thumb, around the mouse, with the finger tips adjacent the bottom of the mouse, and with the first finger tip only spaced about 2 to 4 cm from the end of the thumb. The neck portion 14, which is extending at a selected angle to the main body portion of the mouse as described above is desirably of a narrow corresponding width. Thus the neck portion 14 fits between the relaxed first finger and thumb, for improved fine movement control, and, as described above, improved control switch operation by squeezing the neck portion 14 between the end of the first finger and the thumb.

As an alternative embodiment, for dual (right or left handed) users, although less desirable, a mouse with two narrow extending neck portions instead of one could be provided, i.e., a "Y" or "T" shaped mouse rather that the boomerang shaped mouse 10.

As a hand orientation or alignment aid to the mouse, an elongated finger groove or slot can be provided in the mouse body instead of or in addition to the fin 16.

While the embodiments disclosed herein are preferred, it will be appreciated from this teaching that various alternatives, modifications, variations or improvements therein may be made by those skilled in the art, which are intended to be encompassed by the following claims.

What is claimed is:

1. In a user hand movable computer mouse with a mouse movement sensing system for providing mouse movement signals, and at least one user finger operable control switch, for providing control signals for a graphic user interface, the improvement in said computer mouse comprising:

a mouse body ergonomically shaped to fit and support the user hand in a naturally relaxed hand position, and a mouse movement control fin integral with said mouse body for said user hand mouse movement, said control fin extending substantially above said mouse body, said control fin being thinly shaped to fit in between adjacent fingers of the user hand to orient said mouse body to the user hand and for said user hand movement of said mouse.

2. The user hand movable computer mouse of claim 1, wherein said mouse body has a main body portion and an extending neck portion, and said extending neck portion extends at an angle to said main body portion.

3. The user hand movable computer mouse of claim 1, wherein said control fin is adapted to be alternatively grasped between the user thumb and first finger for pen like movement of said mouse thereby.

4. The user hand movable computer mouse of claim 2, wherein said control fin is integral with said main body portion and is elongated along an axis generally parallel to the axis of said main body portion.

5. The user hand movable computer mouse of claim 2, wherein said mouse movement sensing system is positioned in said main body portion adjacent one end thereof opposite from said extending neck portion.

6. The user hand movable computer mouse of claim 2, wherein said extending neck portion has control switches on opposite sides thereof.

7. The user hand movable computer mouse of claim 2, wherein said extending neck portion is at an angle of between approximately 45 degrees to 90 degrees to said main body portion.

8. The user hand movable computer mouse of claim 1, wherein said user hand moveable computer mouse has a leading end and a trailing end, and wherein said mouse movement sensing system is adjacent to said trailing end.

9. The user hand movable computer mouse of claim 1, wherein said mouse is a dual use mode mouse shaped to provide two different ergonomically correct hand supporting and mouse hand movement positions, wherein;

said control fin is adapted to be loosely held between the adjacent first and second fingers of the user hand in a first hand position, and said same control tin is adapted to be held in a second and different hand position in which said control fin is gripped between the thumb and first finger of the user hand in a pencil-like hand grip.

10. The user hand movable computer mouse of claim 9, wherein said mouse has at least two duplicative functions but differently positioned said user finger operable control switches for said respective dual use modes.

11. The user hand movable computer mouse of claim 1, wherein said mouse body has a main body portion and an extending neck portion, and said extending neck portion extends at an angle to said main body portion, wherein said main body portion has an extending wrist support trailer member.

12. The user hand movable computer mouse of claim 1, wherein said mouse body has a main body portion with an extending wrist support member, and wherein said mouse movement sensing system is positioned in said main body portion adjacent to said wrist support trailer member.

13. In a user hand movable computer mouse with a mouse movement sensing system for providing mouse movement signals, and at least one user finger operable control switch, for providing control signals for a graphic user interface, the improvement in said computer mouse comprising:

a mouse body ergonomically shaped to fit and support the user hand in a naturally relaxed hand position, and a mouse movement control fin integral with said mouse body for said user hand mouse movement, said control fin extending substantially above said mouse body, said control fin being thinly shaped to fit in between adjacent fingers of the user hand to orient said mouse body to the user hand and for said user hand movement of said mouse, wherein said mouse body has a main body portion and an extending neck portion, and said extending neck portion extends at an angle to said main body portion, and wherein said main body portion has an attached extending wrist support trailer member.

14. In a user hand movable computer mouse with a mouse movement sensing system for providing mouse movement signals, and at least one user finger operable control switch, for providing control signals for a graphic user interface, the improvement in said computer mouse comprising:

a mouse body ergonomically shaped to fit and support the user hand in a naturally relaxed hand position, and a mouse movement control fin integral with said mouse body for said user hand mouse movement.

said control fin extending substantially above said mouse body, said control fin being thinly shaped to fit in between adjacent fingers of the user hand to orient said mouse body to the user hand and for said user hand movement of said mouse, wherein said mouse body has a main body portion and an extending neck portion, and said extending neck portion extends at an angle to said main body portion, and wherein said main body portion has an attached extending wrist support trailer member, and wherein said mouse movement sensing system is positioned in said main body portion adjacent said wrist support trailer member.

15. In a user hand movable computer mouse with a mouse movement sensing system for providing mouse movement signals as said mouse is held and moved by the user relative to a mouse supporting surface, with said mouse having an mouse body with inner and outer areas, and at least one user operable control switch for providing control signals for a graphic user interface, the improvement in said computer mouse wherein:

said mouse body comprises a main mouse body portion with a generally arcuate upper surface ergonomically shaped to fit and support the user hand in a naturally relaxed hand position with plural user fingertips and the user thumb curved around the outside of said mouse body in said outer area and extending downwardly towards the mouse supporting surface to allow tactile referencing with the mouse supporting surface, said mouse body further having a relatively narrower neck portion laterally extending from said outer area of said main mouse body in a position to be interposed between the naturally opposing thumb and first finger position of the user, said laterally extending relatively narrower neck portion of said mouse body having a said user operable control switch for providing control signals for a graphic user interface, which control switch is actuatable by squeezing the user naturally opposing thumb and first finger together on opposing sides of said laterally extending relatively narrower neck portion of said mouse body, and a thin mouse movement control fin elongated in the direction of said inner to outer areas and extending vertically above said main mouse body in a position for interposition between the sides of adjacent fingers of the user when the user is holding said mouse body in a naturally relaxed hand position for said user hand movement of said mouse.

16. The user hand movable computer mouse of claim 15, wherein said mouse movement sensing system is positioned in said inner area of said mouse body.

17. The user hand movable computer mouse of claim 15, wherein a wrist supporting member extends from said inner area of said mouse body.

18. The user hand movable computer mouse of claim 15, wherein a wrist supporting member extends from said inner area of said mouse body, and wherein said mouse movement sensing system for providing mouse movement signals as said mouse is held and moved by the user relative to a mouse supporting surface is positioned in said inner area of said mouse body adjacent to said wrist supporting member to reduce user lateral wrist motion tendencies.

19. The user hand movable computer mouse of claim 15, wherein said laterally extending relatively narrower neck portion of said mouse body extends laterally outwardly at an angle of approximately 45 to 90 degrees from said outer area of said main mouse body.

20. The user hand movable computer mouse of claim 15, wherein said mouse body, including said laterally extending relatively narrower neck portion, has an overall boomerang shape.

* * * * *